United States Patent [19]

Calladine et al.

[11] Patent Number: 5,582,284
[45] Date of Patent: Dec. 10, 1996

[54] TRANSPORT APPARATUS

[75] Inventors: David Calladine, Staffs; David Lynch, Mickleover, both of United Kingdom

[73] Assignee: Defabs Engineering Systems Limited, Derby, United Kingdom

[21] Appl. No.: 220,837

[22] Filed: Mar. 31, 1994

[30] Foreign Application Priority Data

Apr. 5, 1993 [GB] United Kingdom .................. 9307048
Sep. 17, 1993 [GB] United Kingdom .................. 9319356

[51] Int. Cl.⁶ ............................................. B65G 47/30
[52] U.S. Cl. ............................................. 198/367; 198/442
[58] Field of Search ............................... 198/367, 442, 198/368; 414/676

[56] References Cited

U.S. PATENT DOCUMENTS

| 2,586,988 | 2/1952 | Page ............................. | 198/367 |
| 3,580,640 | 5/1971 | Eriksson ....................... | 198/442 |
| 3,999,806 | 12/1976 | Hurd ............................ | 302/28 |
| 4,147,248 | 4/1979 | Kurczak et al. ............... | 198/367 |
| 4,860,882 | 8/1989 | Maeda et al. ................. | 198/442 |

FOREIGN PATENT DOCUMENTS

| 588298 | 3/1994 | European Pat. Off. ....... | 198/442 |
| 2259770 | 8/1975 | France . | |
| 2431955 | 2/1980 | France . | |
| 2548638 | 1/1985 | France . | |
| 765013 | 1/1957 | United Kingdom . | |
| 820731 | 9/1959 | United Kingdom . | |
| 1274788 | 5/1972 | United Kingdom . | |
| 1397017 | 7/1975 | United Kingdom . | |
| 2060536 | 5/1981 | United Kingdom . | |
| 2157637 | 10/1985 | United Kingdom . | |
| 2260305 | 4/1993 | United Kingdom . | |

*Primary Examiner*—David A. Bucci
*Assistant Examiner*—Janice L. Krizek
*Attorney, Agent, or Firm*—W. Thad Adams, III, P.A.

[57] ABSTRACT

Article transport apparatus (10) comprises first and second transports (12,14) for transporting a plurality of articles, in the form of biscuits (100). The second transport is arranged to receive biscuits from the first transport, and the second transport comprises a plurality of lanes (18) extending lengthwise of the second transport, along which articles can be transported. The first transport comprises a guide (20,22, 28) to guide the article towards at least a selected one of the lanes. The guide may be in the form of laterally movable walls (20,22) or rotatable members (28).

30 Claims, 6 Drawing Sheets

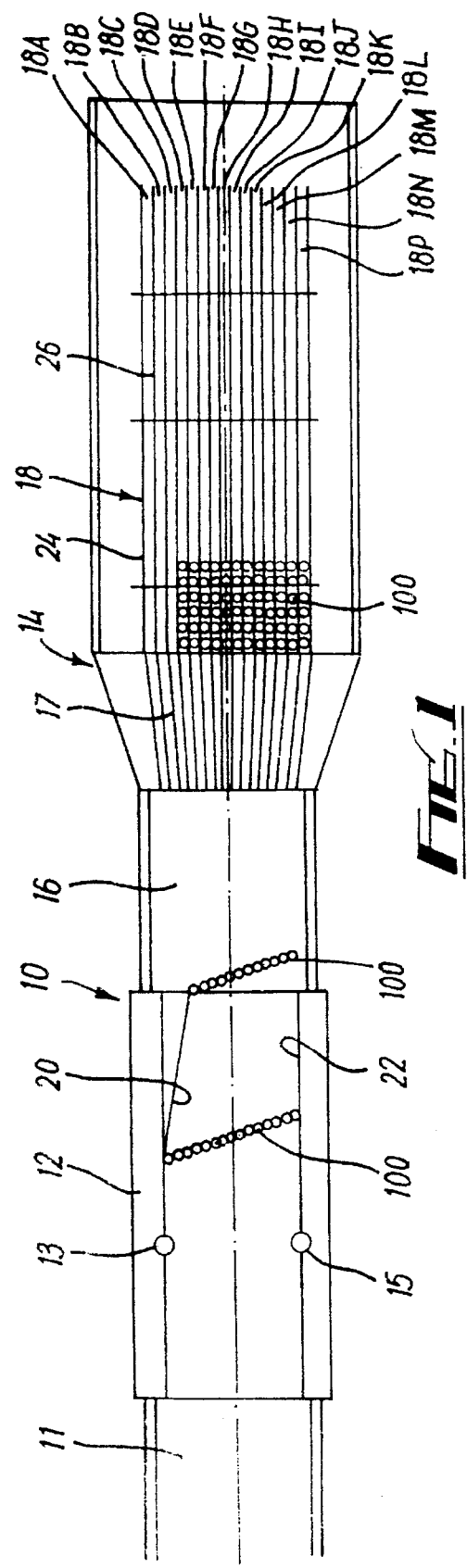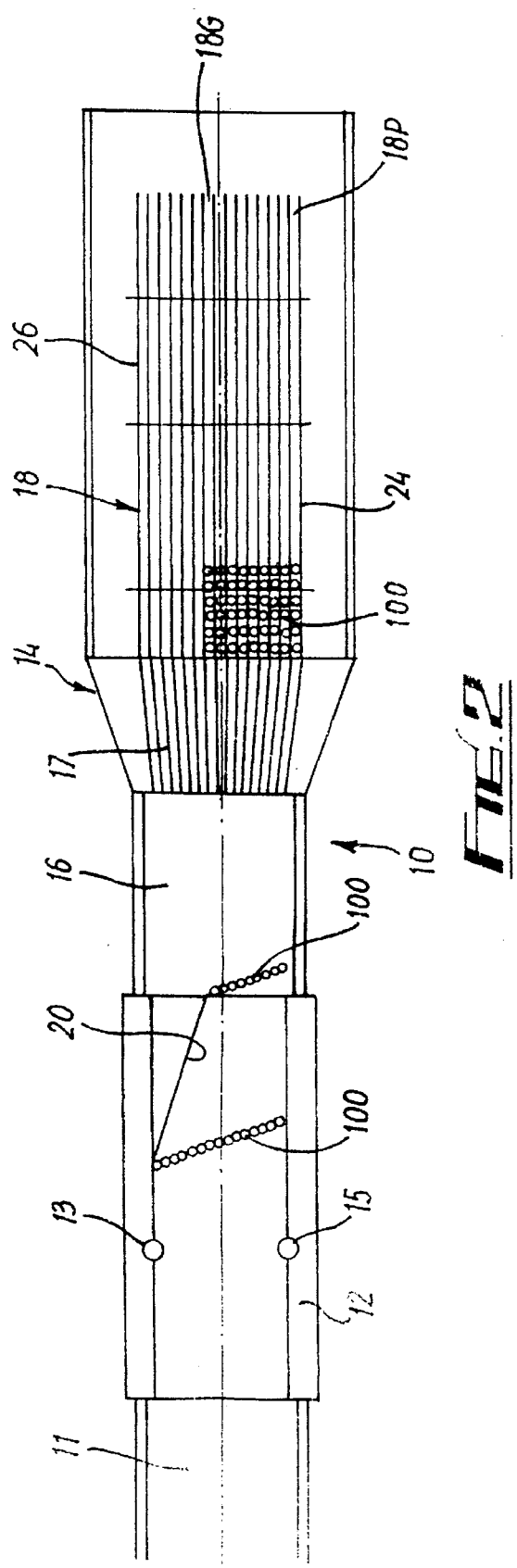

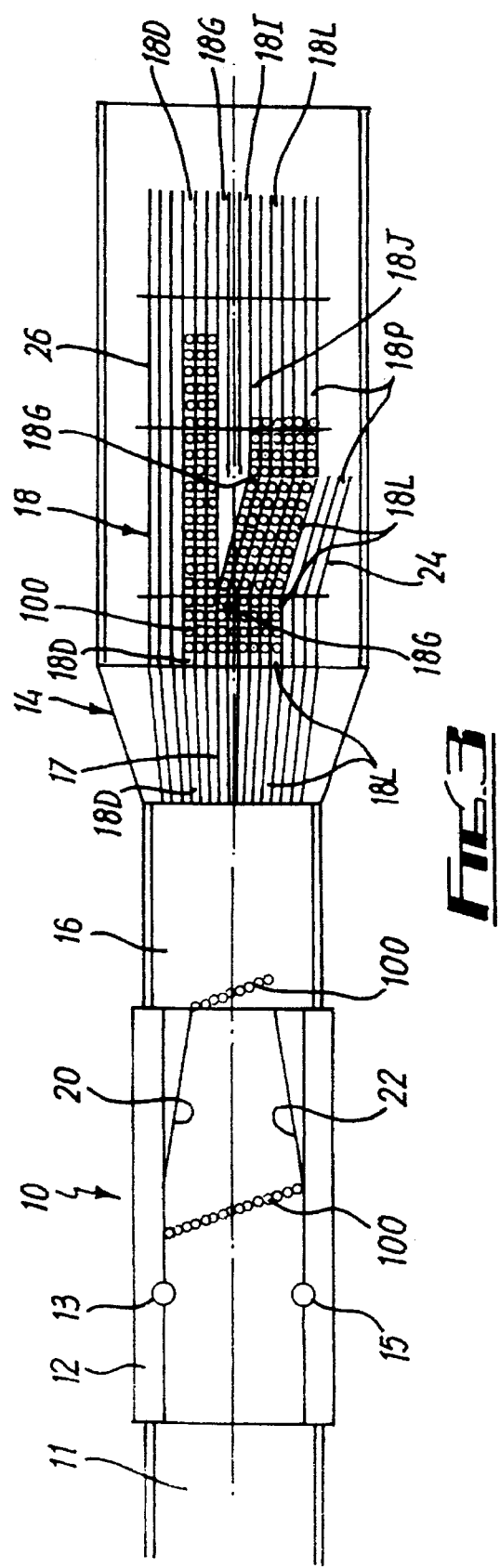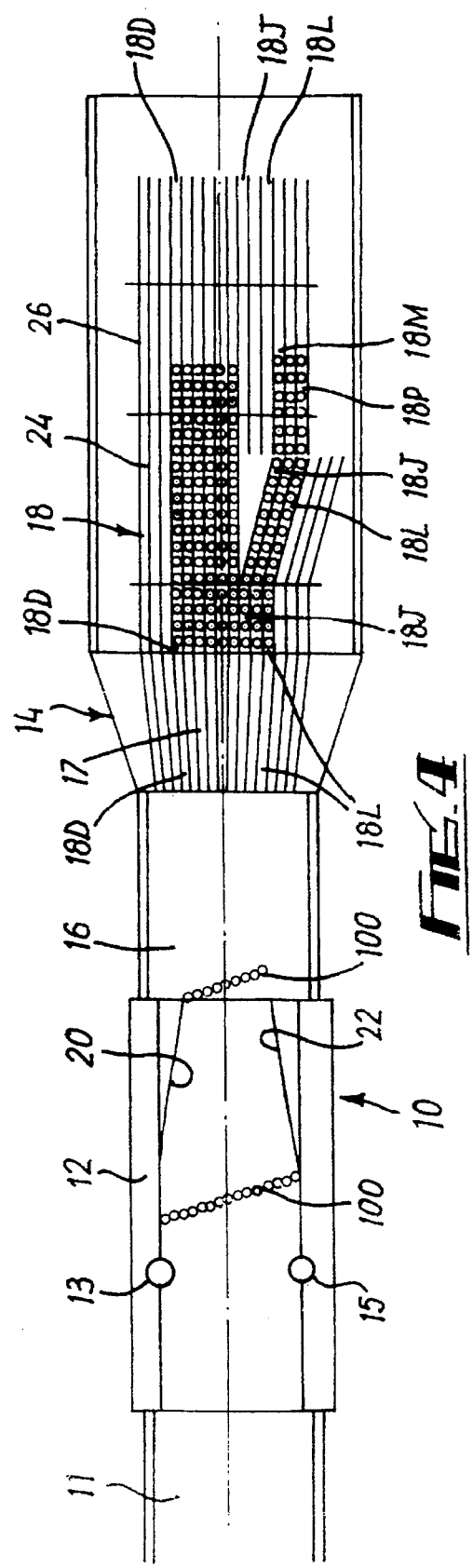

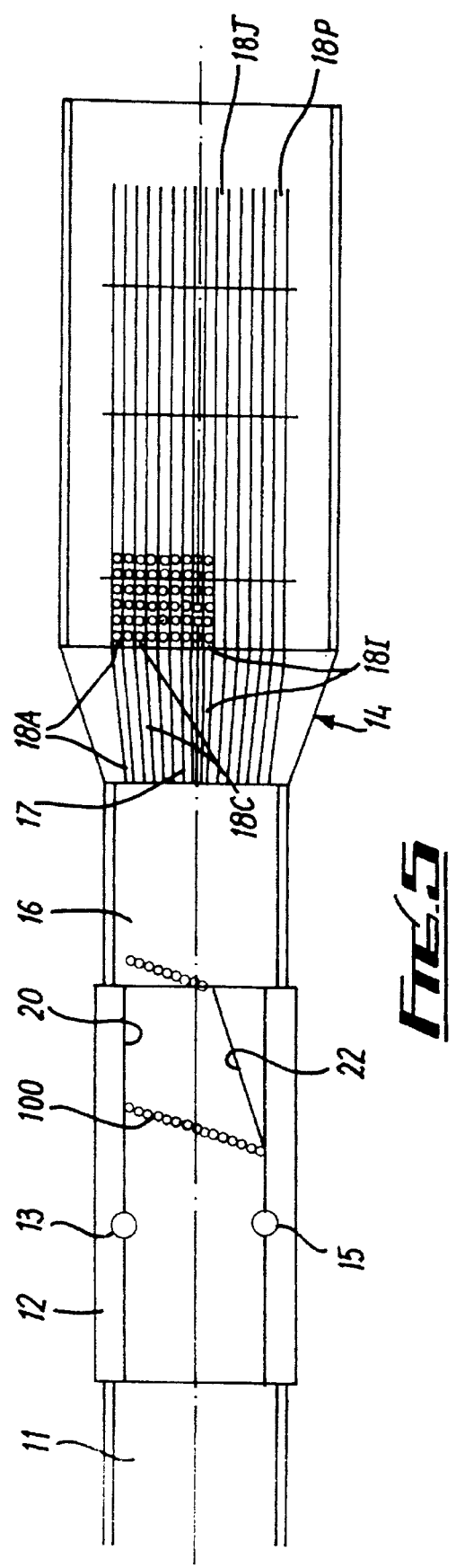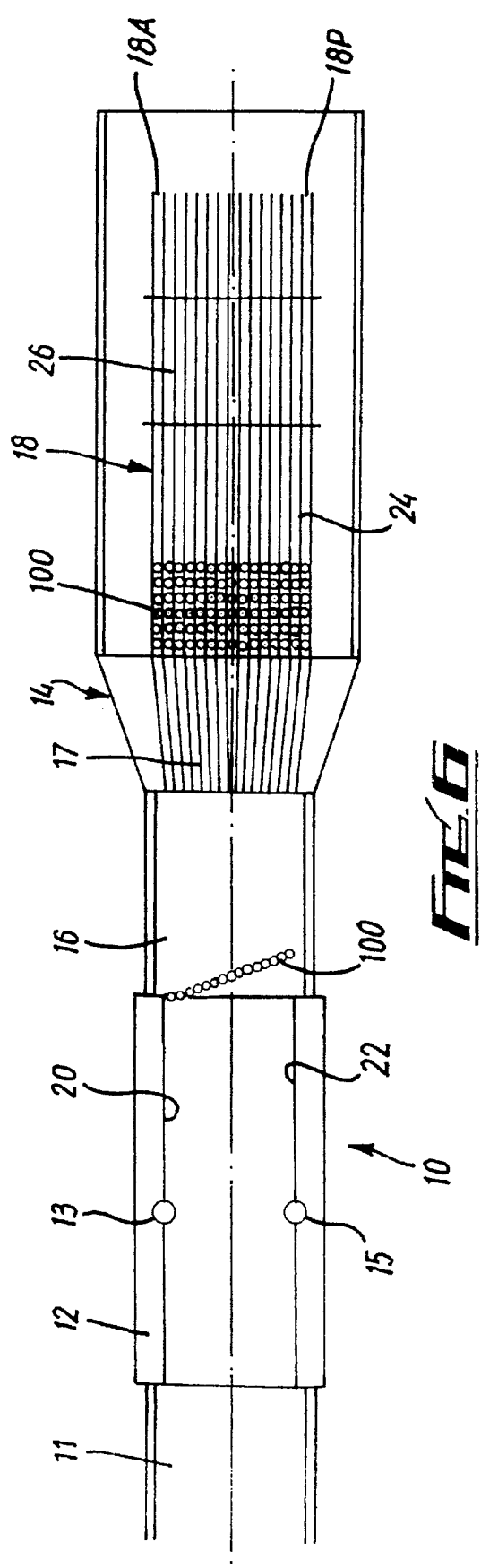

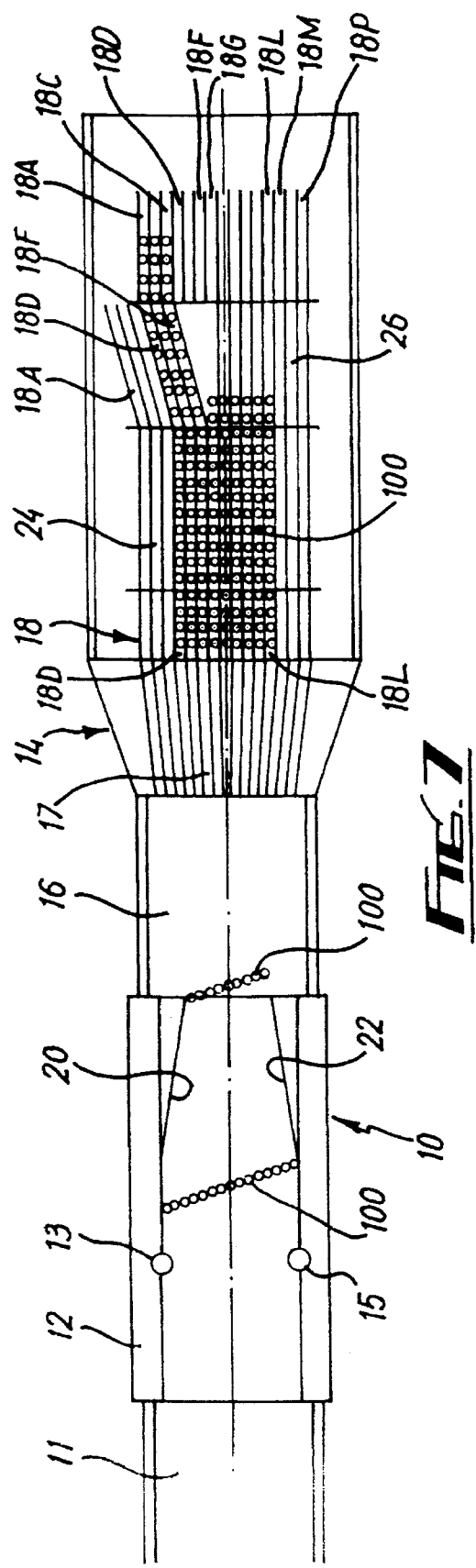
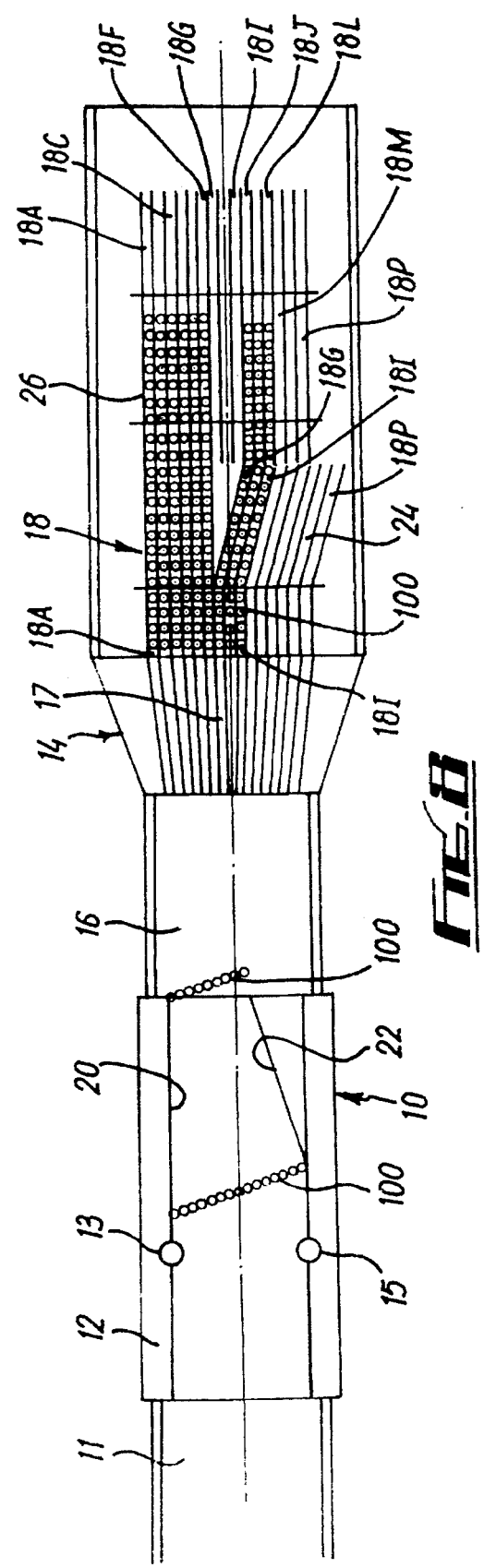

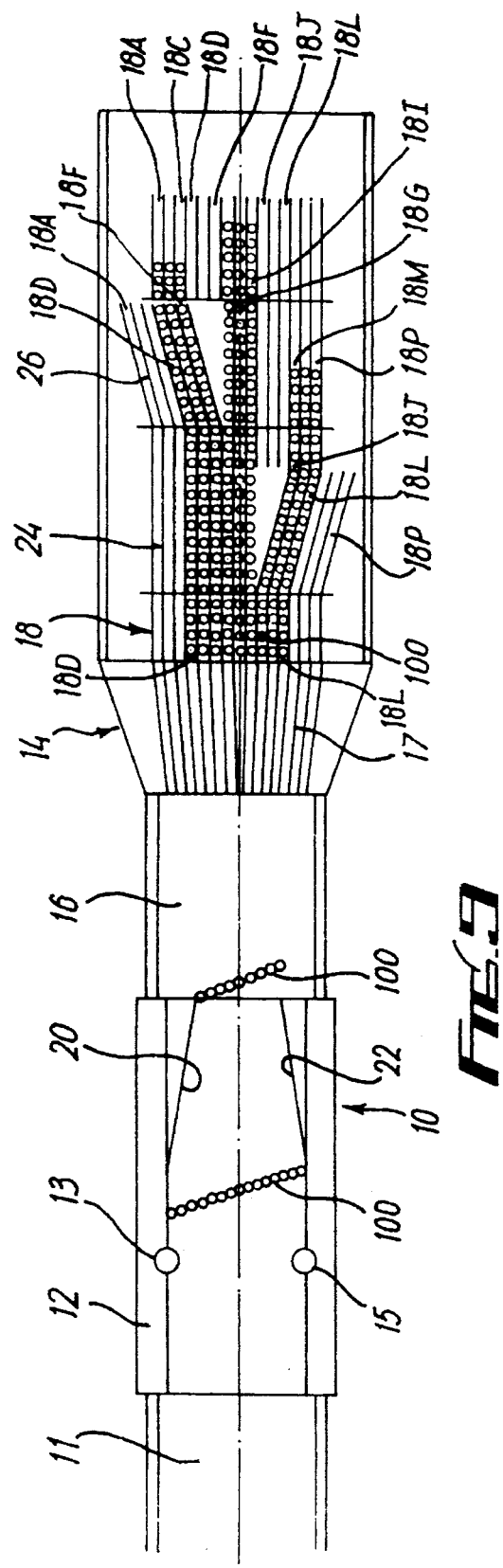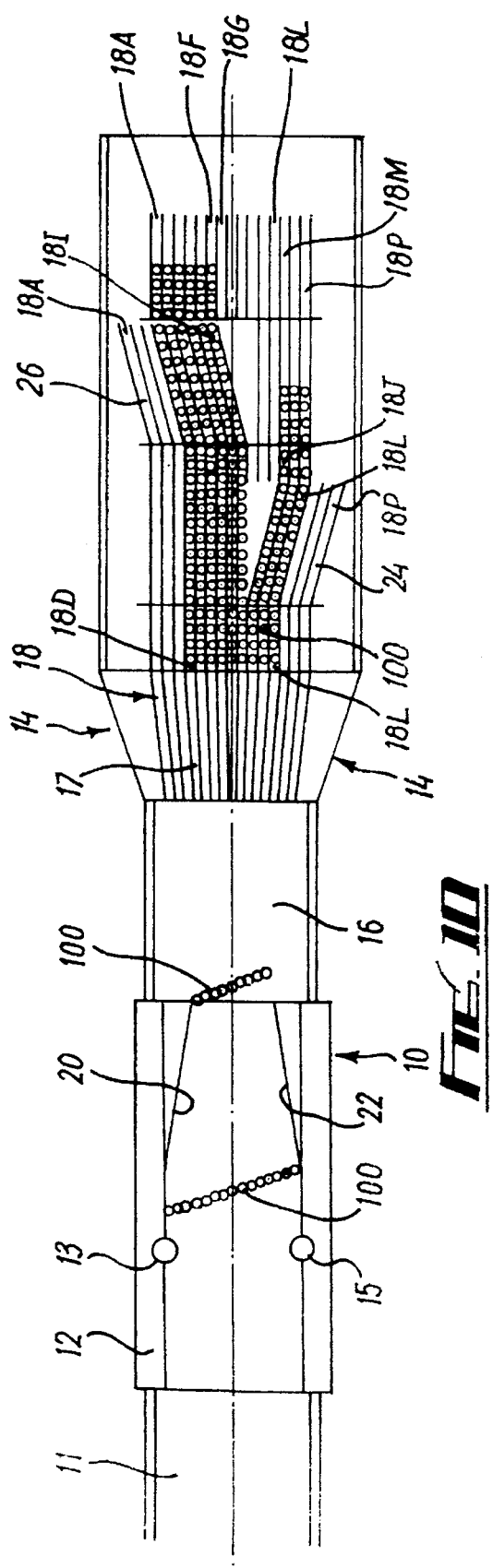

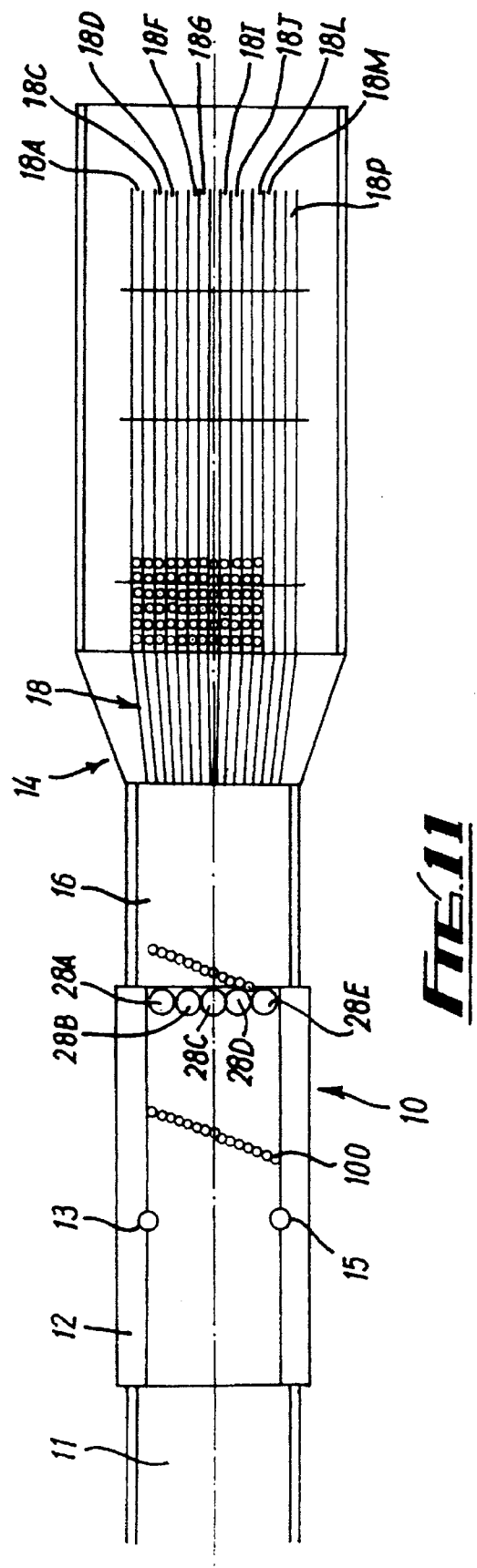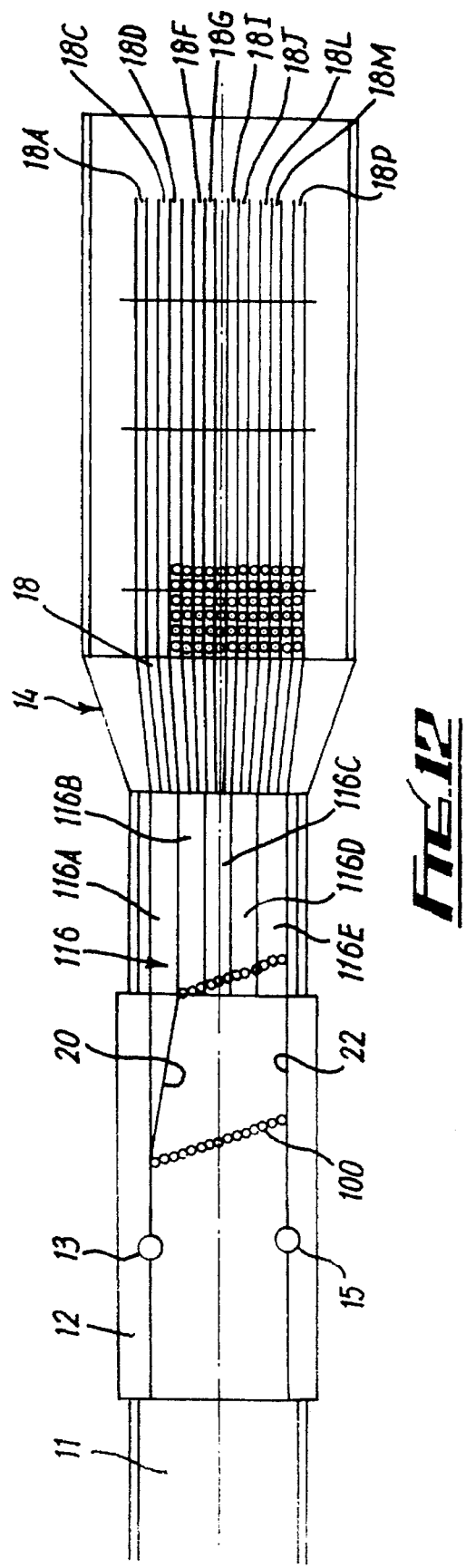

TRANSPORT APPARATUS

FIELD OF THE INVENTION

This invention relates to transport apparatus. In particular, but not exclusively, this invention relates to transport apparatus for transporting articles such as biscuits.

BACKGROUND TO THE INVENTION

In the food industry, particularly that aspect of the industry relating to the production of biscuits, there is a need to transport the biscuits from one part of the factory to the wrapping machines. This is usually done by a conveyor. An example of such a conveyor is disclosed in our co-pending patent application published under U.K. Patent Application No. 2260305. This specification discloses apparatus which can transport biscuits to the wrapping machines.

Usually, the factories employ several wrapping machines wrapping biscuits on one conveyor. In the event that one of the wrapping machines fails, it is necessary to divert the biscuits destined for that machine to another of the machines. In the prior art devices, this has been done by the use of gates closing off one or more lanes.

However, while such gates are adequate at slow speeds, they lead to problems at higher speeds since the biscuits can build up around the closed lanes.

It is an object of this invention to obviate and/or mitigate this disadvantage of the prior art.

SUMMARY OF THE INVENTION

According to one aspect of this invention, there is provided transport apparatus for transporting articles, said apparatus comprising first and second transport means, the first transport means being provided with a guide means to guide the articles to the second transport means in a desired arrangement, and the second transport means comprising a plurality of lanes for the articles.

According to a further aspect of this invention, there is provided article transport apparatus comprising first and second transport means for transporting a plurality of articles, the second transport means being arranged to receive articles from the first transport means, and said second transport means comprising a plurality of lanes extending lengthwise thereof along which the article can be transported, the first transport means comprising guide means to guide the articles towards at least a selected one of the lanes, and the lanes being selectively movable laterally to divert the articles from one or more of said lanes to one or more other of said lanes.

The transport means may include a surface along which the articles can travel. The guide means may comprise at least one wall member movable laterally across said surface. Preferably the guide means comprises a pair of opposed wall members movable laterally across said surface.

According to a further aspect of the invention, there is provided article transport apparatus comprising first and second transport means for transporting a plurality of articles, the second transport means being arranged to receive articles from the first transport means, and said second transport means comprising a plurality of lanes extending lengthwise of the apparatus along which the articles can be transported, the first transport means comprising a plurality of rotatable members arranged across the first transport means, said rotatable members being adapted to prevent articles being directed towards a selected one or more of the lanes.

This invention is particularly suitable for the transportation of articles which are substantially circular in plan view.

The rotatable members may be movable between a first position in which the upper surfaces thereof are flush with the surface of the first transport means, and a second position in which the rotatable members block the path of articles on the first article transport means.

Preferably the first transport means defines a low friction zone across which the article can travel. The first transport means is in the form of an airbed, which may slope at an angle of between 1° and 6°, preferably between 2° and 3°.

Preferably the rotatable members are arranged across the exit of the first transport means and may be in the form of rotatable discs.

Each lane is preferably provided with a conveyor to convey the articles in said lanes. The second transport means may include channelling means arranged between the lanes and the first transport means. Preferably the channelling means comprises a plurality of paths to channel the articles to corresponding lanes. The channelling means may be sloped downwardly towards said lanes at an angle of between 15° and 20°, preferably substantially 18°, whereby the articles can slide towards the lanes.

The apparatus may further include intermediate conveying means arranged between the first transport means and the second transport means. The intermediate conveying means may be in the form of at least one belt conveyor to convey said articles.

The intermediate conveying means may comprise a plurality of belt conveyors arranged side by side. Each belt conveyor may be adapted to convey articles to selected lanes.

Preferably the speed of the belt conveyors of the intermediate conveying means are individually controllable, thereby allowing articles to travel at different desired speeds along the intermediate conveying means.

If desired, separating means can be provided between adjacent belt conveyors of said intermediate conveying means.

The lanes may be arranged in first and second sections, the second section being downstream of the first section. The first section may comprise a plurality of lanes adapted to be movable laterally in a first direction, and the second section may comprise a plurality of lanes adapted to be movable laterally in a second direction.

Each of said first and second sections may comprise a plurality of outer lanes movable independently of a plurality of inner lanes.

According to another aspect of this invention there is provided a method for transporting articles, said method comprises guiding said articles on a first transport means to a second transport means in a desired arrangement, and thereafter transporting said articles in a plurality of lanes on the second transport means.

According to a further aspect of this invention, there is provided a method for transporting articles, said method comprising guiding said articles on a first transport means to a second transport means in a desired arrangement, and thereafter transporting said articles in a plurality of lanes on the second transport means, wherein the articles on the second transport means can be selectively diverted laterally by selectively movable lanes.

Preferably, the articles can be guided on the first transport means by at least one lateral movable wall member, preferably a pair of opposed movable wall members.

According to a further aspect of the invention, there is provided a method for transporting articles, said method comprising guiding said articles on a first transport means to a second transport means, in a desired arrangement, end thereafter transporting said articles in a plurality of lanes on the second transport means, wherein the articles can be guided by the use of a plurality of selectively movable rotatable members adapted to be moved into the path of articles on the first transport means to block the path of some of the articles thereon.

BRIEF DESCRIPTION OF THE DRAWINGS

Embodiments of the invention will now be described by way of example only, with reference to the accompanying drawings, in which:

FIGS. 1 to 10, show schematic plan views of apparatus according to first embodiment, and showing examples of the different arrangements; and FIGS. 11 and 12 show schematic plan views of apparatus according to second and third embodiments.

DESCRIPTION OF PREFERRED EMBODIMENTS

Referring to FIGS. 1 to 10, there is shown transport apparatus 10 which comprises a feed conveyor 11, adapted to feed biscuits 100 to first transport means in the form of an airbed 12 which is sloped downwardly from the feed conveyor 11, at an angle of between 2° and 3°, to second transport means 14 which comprises an intermediate conveyor 16, channelling means in the form of a channelling board 17 and a plurality of lanes 18. The intermediate conveyor 16 conveys the biscuits 100 through the channelling board 17 to the plurality of driven lanes 18. The channelling board 17 is sloped at an angle of 18°.

The airbed 12 is provided with randomising means in the form of first and second rotating discs 13, 15 arranged substantially opposite each other on either side of the airbed 12. The biscuits 100 adjacent the sides of the airbed 12 engage the discs 13, 15 and are thereby moved towards the centre of the airbed. In turn, biscuits travelling along the airbed 12 in a central region move outwardly. Thus, the rotating discs 13, 15 create a randomising effect of the biscuits 100 on the airbed 12.

The biscuits slide down the channelling board 17 to the driven lanes 18 which drives the biscuits by conveyor. Two conveyors are provided in each lane, a metering conveyor to space the biscuits 100 arriving from the channelling board 17 which leads to a pitch conveyor which spaces the biscuits accurately.

In the embodiment shown there are fifteen lanes 18 which are labelled 18A to 18P. The lanes 18 deliver the biscuits to a plurality of wrapping machines. The lanes 18 deliver the biscuits 100 to four wrapping machines, each wrapping machine being fed by three lanes. The first wrapping machine is fed by lanes 18D to 18F, the second wrapping machine is fed by lanes 18G to 18I, the third wrapping machine is fed by lanes 18J to 18L, and the fourth wrapping machine is fed by lanes 18M to 18P. Lanes 18A to 18C lead to a region where wrapping takes place manually. The conveyors 11 and 16 consist of endless belt conveyors which are continuously driven to transport the biscuits.

The plurality of lanes 18 are divided into first and second sections 24, 26. In the first section, lanes 18G to 18P can be moved outwardly to divert the biscuits 100 on those lanes by three lanes. Thus, for example, the biscuits 100 on lane 18G can be diverted to lane 18J. This enables biscuits destined for the second wrapping machine, for example, to be diverted to the third wrapping machine. In the second section 26, lanes 18A to 18I can be moved outwardly to divert the biscuits by three lanes. In each of the sections 24, 26 the outer 6 lanes are movable together and the inner three lanes are movable together but independently of the outer lanes. Thus, in the first section 24, lanes 18J to 18P are movable independently of lanes 18G to 18I, and in the second section 26, lanes 18A to 18F are movable independently of lanes 18G to 18I.

The channelling board 17 is also provided with lanes and each lane has an aperture (not shown) and a sliding door (not shown) to cover the aperture. In the event that any of the lanes 18 are to be diverted, biscuits 100 should not be sent down that particular lane and the sliding door in the corresponding lane 17 is opened to allow the biscuits to fall down a chute (not shown) to a receptacle (not shown) where they can be packed manually.

Alternatively, the apparatus can be controlled such that movement of the channelling means 16 (or 116—see below) is interrupted for a short period of time (for example 1 to 3 seconds). This creates a gap in the biscuits 100 on the conveyor. Diversion of the appropriate lanes 18 can then be delayed until the gap in the biscuits passes the region where the lanes 18 are diverted. This has the advantage that it is not necessary to dispose of biscuits down a chute which can be time consuming and can damage the biscuits 100.

The airbed 12 comprises guide means in the form of a pair of opposed movable walls 20, 22 which ara adapted to guide the biscuits 100 to a predetermined arrangement such that they are conveyed by the conveyor 16 only to the lanes 18 where biscuits 100 are desired.

In the arrangement shown in FIG. 1, the movable wall 20 is moved inwardly of the airbed to a first position to guide the biscuits 100 such that they enter only lanes 18D to 18P. Thus, in this arrangement, the manual wrapping of the biscuits is not required. This is normal running of the apparatus 10 and the wrapping machines.

It will be appreciated that the use of the airbed 12 ensures that the biscuits are in a random arrangement thereon and enables them to be easily re-arranged by the movable walls 20, 22 to the desired arrangement such that they are fed only to the desired lanes 18.

In FIG. 2, the guide means 20 is moved further inwardly of the airbed 12 to a second position to guide the biscuits 100 only to lanes 18G and 18P. Thus, in this particular arrangement, the first wrapping machine has failed and the biscuits are being delivered by lanes 18G to 18P to the second, third and fourth wrapping machines.

In FIG. 3, the second wrapping machine has failed and the biscuits destined originally for that wrapping machine have been diverted to the first, third and fourth machines. As can be seen from the drawing, movable walls 20 and 22 have both moved inwardly of the airbed 12 to first positions to guide the biscuits 100 to lanes 18D to 18L. In order to divert the biscuits in lanes 18G to 18I, the first section 24 of the lanes 18 has moved the lanes 18G to 18P outwardly such that the biscuits originally in lanes 18G to 18L have been diverted to lanes 18J to 18P, thus diverting all biscuits 100 away from lanes 18G to 18I, and consequently, away from the second wrapping machine.

In the arrangement shown in FIG. 4, the third wrapping machine has failed and thus, it is necessary to divert biscuits away from lanes 18J to 18L. In order to do this, the movable walls 20 and 22 are moved inwardly as shown, to first positions, to direct the biscuits 100 towards the lanes 18D to 18L. The lanes 18J to 18P at the first section 24 of the lanes 18 are moved outwardly to divert the biscuits in lanes 18j to 18L into lanes 18M to 18P.

In the arrangement shown in FIG. 5, the third and fourth wrapping machines have failed and so it is necessary to divert the biscuits away from lanes 18J to 18P. In order to do this, the movable wall 20 is moved back against the side of the airbed and the movable wall 22 is moved inwards of the airbed to its second position as shown, such that the biscuits are directed towards lanes 18A to 18I. In this arrangement it is necessary to direct the biscuits towards lanes 18A to 18C and thus manual wrapping will be required. No diversion of the biscuits 100 on the lanes is required.

FIG. 6 shows an arrangement where it is necessary to pack more biscuits than in a case where normal running of the apparatus 10 is required. In this arrangement, the movable walls 20 and 22 are both in their position against the sides of the airbed such that the biscuits 100 are directed towards all fifteen lanes 18A to 18P. No diversion is required either at the airbed 12 or at the sections 24, 26 of the lanes 18.

In the arrangement shown in FIG. 7, the first and fourth wrapping machines have failed and it is necessary to divert the biscuits 100 away from lanes 18D to 18F and from lanes 18M to 18P. Thus, the movable walls 20,22 are moved inwardly to guide the biscuits 100 to the lanes 18D to 18L. The lanes at the first section 24 are not diverted but lanes 18A to 18F in the second section 26 are moved outwardly to divert the biscuits in lanes 18D to 18F to lanes 18A to 18C. The biscuits in lanes 18G to 18L remain undiverted. Thus, all the biscuits are transported to wrapping machines 2 and 3 and to the region for manually wrapping the biscuits.

In the arrangement shown in FIG. 8, the second and fourth wrapping machines have failed and so it is necessary to divert the biscuits away from lanes 18G to 18I and lanes 18M to 18P. This is done by moving the movable wall 20 against the side of the airbed 12 and moving the movable wall 22 to its second position. Thus, the biscuits 100 are guided towards the lanes 18A to 18I. In order to divert the biscuits away from the lanes feeding wrapping machine No. 2, lanes 18G to 18P at the first section 24 are moved outwardly such that the biscuits on lanes 18G to 18I are diverted to lanes 18J to 18L. Thus, biscuits are fed to the first and third wrapping machine and to the region for manually wrapping the biscuits fed by lanes 18A to 18C.

In the arrangement shown in FIG. 9, the first and third wrapping machines have failed and so it is necessary to divert biscuits away from lanes 18D to 18F and lanes 18J to 18L. In order to do this, the movable walls 20, 22 are moved to their first positions to guide the biscuits 100 to the lanes 18D to 18L. At the first section 24 of the lanes 18, the lanes 18J to 18P are moved outwardly such that the biscuits in lanes 18J to 18L are diverted to lanes 18M to 18P. Also, at the second section 26 the lanes 18A to 18F are diverted outwardly in opposite directions to lanes 18J to 18P in the first section 24, such that the biscuits in the lanes 18D to 18F are diverted to lanes 18A to 18C. The biscuits in lanes 18G to 18I are not diverted. Thus, biscuits are fed along lanes 18A to 18C, lanes 18G to 18I and lanes 18M to 18P to feed biscuits to the manual packing region, and to the second and fourth wrapping machines Nos. 2 and 4.

In the arrangement shown in FIG. 10, the second and third wrapping machines have failed and so it is necessary to divert biscuits away from lanes 18G to 18L. This is done by moving the movable walls 20,22 to their first position such that the biscuits 100 are guided to the lanes 18D to 18L. Lanes 18J to 18P in the first section 24 are moved outwardly, as shown, to divert the biscuits 100 on lanes 18J to 18L to lanes 18M to 18P. Also, lanes 18A to 18I in the second section 26 are moved outwardly, as shown to divert the biscuits in lanes 18D to 18I to lanes 18A to 18F. Thus, the biscuits are delivered to the manual wrapping region via lanes 18A to 18C, to the first wrapping machine via lanes 18D to 18F and to the fourth wrapping machine via lanes 18M to 18P.

In each of the above cases, where lane diversion occurs, the biscuits on lanes 18A to 18D and lanes 18M to 18P will not be lost. The reason for this is that sliding openings in these lanes will open for a period of substantially two seconds before the lanes are moved to enable to biscuits on those lanes to fall down chutes beneath the lanes 18 to receptacles where they can be packed manually.

Sensing means in the form of a proximity unit (not shown) is arranged above the lanes downstream of the second section 26, the proximity unit detects when a wrapping machine wrapping biscuits on particular lanes has failed because the biscuits in those lanes will be caused to move to a substantially vertical positions and there is resultant back-up of biscuits in the vertical position which will trigger sensors on the proximity unit. The proximity unit will then transmit an appropriate signal to a computer control unit to actuate the appropriate movement of the movable walls 20,22, the lanes in the first and second sections 24,26, and the sliding doors in the lanes 18.

It will be appreciated that the above described arrangements as shown in FIGS. 1 to 10 are only examples and many other arrangements may occur where different combinations of wrapping machines fail.

Referring now to FIG. 11, there is shown a second embodiment of the invention in which the same features as those shown in FIGS. 1 to 10 are given the same reference numerals. In the second embodiment, the movable walls 20,22 are omitted and are replaced by a plurality of rotating discs 28. Also, the lanes 18 are static and cannot be moved.

In use, the discs are arranged such that their upper surfaces are flush with the surface of the airbed 12, so that biscuits can pass over them. The discs 28 are provided with apertures to allow the passage of air therethrough. In order to block a desired one or more of the lanes, the corresponding disc 28 is raised such that biscuits cannot pass through to the particular lanes to be blocked. The rotation of the disc 28 causes biscuits coming into contact with it to be deflected into the path of one of the lanes which is not blocked. As shown in FIG. 11, disc 28A is intended to block lanes 18A to 18C, disc 28B is intended to block lanes 18D to 18F, disc 28C is intended to block lanes 18G to 18I disc 28D is intended to block lanes 18J to 18L, and disc 28E is intended to block lanes 18M to 18P. In the arrangement shown in FIG. 11, the fourth wrapping machine No. 4 has failed, and so it is necessary to block lanes 18M to 18P such that the biscuits 100 can only travel down lanes 18A to 18L. Thus, disc 28E is raised into the path of biscuits on the airbed 12 heading for lanes 18M to 18P and these biscuits are thus deflected towards lanes 18A to 18L. It will be appreciated that by raising or lowering the rotating discs as desired the lanes heading to any one or more of the wrapping machines can be blocked.

Modifications may be made without departing from the scope of the invention. For example, the number of lanes could be varied and the number of rotating discs could also be varied.

FIG. 12 shows another embodiment, which is the same as the embodiment shown in FIGS. 1 to 10, with the exception that the conveyor 16 is replaced by a conveyor 116. In this embodiment, the conveyor 116 comprises five belts 116A to 116E. It will be appreciated that the number of belts can be varied, as desired.

In FIG. 12, belt 116A transports biscuits 100 to lanes 18A to 18C, belt 116B transports biscuits to lanes 18D to 18F, belt 116C transports biscuits to lanes 18G to 18I, belt 116D transports biscuits to lanes 18J to 18L, and belt 116E transports biscuits to lanes 18M to 18P. The speed of each of the belts 116A to 116E is independently adjustable so that the rate of transport of biscuits to any particular wrapping machine can be reduced or increased as desired.

Thus, if it was desired that the wrapping machine fed by lanes 18M to 18P should operate at a slower speed than the other wrapping machines, the speed of belt 116E can be reduced relative to speeds of the other belts thereby reducing the rate of feed of biscuits to that particular wrapping machine.

When the speed of one of the belts 116A to 116E, for example, 116E, is reduced, excess biscuits on the airbed 12 which were destined for belt 116E move across the airbed 12 to one of the other belts 116A to 116D to be transported to the lanes 18. Thus, there is no backing up of biscuits on the airbed 12.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Article transport apparatus comprising:
   first and second transport means for transporting a plurality of articles;
   the second transport means being arranged to receive articles from the first transport means;
   said second transport means comprising a plurality of lanes extending lengthwise thereof along which the articles can be transported;
   the first transport means comprising guide means to guide the articles towards at least a selected one of the lanes; and
   the lanes being selectively movable laterally to divert the articles from one or more of said lanes to one or more other said lanes.

2. Article transport apparatus according to claim 1 wherein the first transport means defines a low friction zone across which the article can travel.

3. Article transport apparatus according to claim 1 wherein the first transport means is in the form of an airbed.

4. Article transport apparatus according to claim 3 wherein the airbed slopes at an angle of between 1° and 6°.

5. Article transport apparatus according to claim 3 wherein the airbed slopes at an angle of between 2° and 3°.

6. Article transport apparatus according to claim 1 wherein the guide means comprises wall members movable laterally across the first article transport means.

7. Article transport apparatus comprising:
   first and second transport means for transporting a plurality of articles;
   the second transport means being arranged to receive articles from the first transport means;
   said second transport means comprising a plurality of lanes extending lengthwise of the apparatus along which the articles can be transported;
   the first transport means comprising a plurality of rotatable members arranged across the first transport means; and
   said rotatable members being adapted to prevent articles being directed towards a selected one or more of the lanes.

8. Article transport apparatus according to claim 7, wherein the rotatable members are movable from a first position in which the upper surfaces thereof are flush with the surface of the first transport means, and a second position in which the rotatable members block the path of articles on the first article transport means.

9. Article transport apparatus according to claim 7 wherein the rotatable members are arranged across the exit of the first transport means.

10. Article transport apparatus according to claim 7 wherein the rotatable members are in the form of rotatable discs.

11. Article transport apparatus according to claim 7 wherein the first transport means defines a low friction zone across which the articles can travel.

12. Article transport apparatus according to claim 7 wherein the first transport means is in the form of an airbed.

13. Article transport apparatus according to claim 12 wherein the airbed slopes at an angle of between 1° and 6°.

14. Article transport apparatus according to claim 13 wherein the airbed slopes at an angle of between 2° and 3°.

15. Article transport apparatus according to claim 1 or 7 wherein each lane is provided with a conveyor to convey the articles in said lanes.

16. Article transport apparatus according to claim 1 or 7 wherein the second transport means includes channelling means arranged between the lanes and the first transport means.

17. Article transport apparatus according to claim 16 wherein the channelling means comprises a plurality of paths to channel the articles to corresponding lanes.

18. Article transport apparatus according to claim 17 wherein the channelling means is sloped downwardly towards said lanes at an angle of between 10° and 25°, whereby the articles can slide towards said lanes.

19. Article transport apparatus according to claim 18 wherein the channelling means slopes at an angle of between 15° and 20°.

20. Article transport apparatus according to claim 18 wherein the channelling means slopes at an angle of substantially 18°.

21. Article transport apparatus according to claim 1 or 7 including intermediate conveying means arranged between the first transport means and the second transport means, the intermediate conveying means being in the form of at least one belt conveyor to convey said articles.

22. Article transport apparatus according to claim 21 wherein the intermediate conveying means comprises a plurality of belt conveyors arranged side by side, each conveyor belt being adapted to convey articles to selected lanes.

23. Article transport apparatus according to claim 22 wherein the speed of the belt conveyors of the intermediate conveying means are individually controllable.

24. Article transport apparatus according to claim 23 wherein separating means are provided between adjacent conveyor belts.

25. Article transport apparatus according to claim 15 wherein the lanes are arranged in first and second sections, the second section being downstream of the first section, the first section comprising a plurality of lanes adapted to be movable laterally in a first direction, and the second section comprising a plurality of lanes adapted to be movable laterally in a second direction.

26. Article transport apparatus according to claim 25 wherein each of said first and second sections comprises a plurality of outer lanes movable independently of a plurality of inner lanes.

27. A method for transporting articles, said method comprising guiding said articles on a first transport means to a second transport means in a desired arrangement, and thereafter transporting said articles in a plurality of lanes on the second transport means, wherein the articles on the second transport means can be selectively diverted laterally be selectively movable lanes.

28. A method according to claim 27, wherein the step of guiding the articles on the first transport means by comprises providing at least one lateral movable wall member.

29. A method according to claim 27, wherein the step of guiding the articles on the first transport means comprises providing a pair of opposed movable wall members.

30. A method for transporting articles, said method comprising guiding said articles on a first transport means to a second transport means, in a desired arrangement, and thereafter transporting said articles in a plurality of lanes on the second transport means, wherein the articles can be guided by the use of a plurality of selectively movable rotatable members adapted to be moved into the path of articles on the first transport means to block the path of some of the articles thereon.

* * * * *